(12) United States Patent
Kropp et al.

(10) Patent No.: US 7,045,001 B1
(45) Date of Patent: May 16, 2006

(54) MULTI-COMPONENT KIT AND METHOD FOR PRETREATMENT, RESURFACING, AND RESTORATION OF PLASTIC MATERIAL

(76) Inventors: Stacy Kropp, 14130 Langley Pl., Davie, FL (US) 33325; Jeremy Drake, 4173 Fisherman's Pl., Cocoa, FL (US) 32926; Victor Winik, 5030 Champion Blvd. 6-Y32, Boca Raton, FL (US) 33496

( * ) Notice: Subject to any disclaimer, the term of this patent is extended or adjusted under 35 U.S.C. 154(b) by 317 days.

(21) Appl. No.: 10/287,244

(22) Filed: Nov. 4, 2002

(51) Int. Cl.
*B05D 1/38* (2006.01)
*C09G 1/02* (2006.01)
*C09G 1/06* (2006.01)
*C09G 1/16* (2006.01)

(52) U.S. Cl. .............................. 106/3; 106/11; 510/463; 510/243; 510/163; 427/140; 427/162; 427/164; 427/322; 427/384

(58) Field of Classification Search ............... 106/3, 106/11; 510/463, 243, 163; 427/140, 162, 427/164, 322, 384
See application file for complete search history.

(56) References Cited

U.S. PATENT DOCUMENTS

| | | | | |
|---|---|---|---|---|
| 4,301,193 A | * | 11/1981 | Zuk | ............... 427/140 |
| 4,544,578 A | | 10/1985 | Duane, Jr. | |
| 4,790,877 A | * | 12/1988 | Vadasz | ............... 106/3 |
| 5,137,541 A | | 8/1992 | Foster | |
| 5,194,293 A | * | 3/1993 | Foster | ............... 427/512 |
| 5,334,335 A | | 8/1994 | Norville | |
| 5,407,615 A | | 4/1995 | Norville | |
| 5,443,604 A | * | 8/1995 | Stowell | ............... 51/307 |
| 6,206,956 B1 | * | 3/2001 | Muntz et al. | ............... 106/3 |
| 6,306,508 B1 | | 10/2001 | Black et al. | |

FOREIGN PATENT DOCUMENTS

JP   09-187725   *   7/1997

* cited by examiner

*Primary Examiner*—C. M. Koslow
(74) *Attorney, Agent, or Firm*—Malloy & Malloy, P.A.

(57) ABSTRACT

A multi-component kit and method is provided to pretreat, resurface, and restore a plastic material, and in particular, the plastic lens covers over the headlights and taillights of an automobile. The multi-component kit includes a pretreatment formulation, a resurfacing formulation, and a restoration formulation. Each formulation is structured for application to the plastic lens covers by hand, thereby eliminating the need for specialized equipment or training. The method includes application of each formulation to the plastic lens covers using clean, lint free applicators. The pretreatment formulation is applied to clean the plastic lens covers and to prepare them for application of the resurfacing formulation, which repairs scratches and removes discoloration. The restoration formulation is applied to restore a high gloss shine to the plastic lens covers as well as to protect the plastic lens covers from the elements such as dust, dirt, and/or ultra-violet radiation.

14 Claims, No Drawings

MULTI-COMPONENT KIT AND METHOD FOR PRETREATMENT, RESURFACING, AND RESTORATION OF PLASTIC MATERIAL

BACKGROUND OF THE INVENTION

1. Field of the Invention

The present invention is directed to a multi-component kit and method for pretreatment, resurfacing, and restoration of a plastic material, and in particular, the plastic lens covers over the headlights and taillights of an automobile, which may be applied without specialized equipment and/or training. The multi-component kit comprises a pretreatment formulation which cleans and prepares the plastic material for the application of subsequent formulations. The multi-component kit also comprises a resurfacing formulation which removes oxidation, yellowing, and other forms of discoloration, and repairs scratches in the plastic material. The multi-component kit further comprises a restoration formulation which provides a final high gloss protective coat over the clean and resurfaced plastic material.

2. Description of the Related Art

The advantages of the numerous plastic materials which are commonplace in nearly every type of consumer product, building material, and transportation device are well known. Plastics are often more lightweight, less expensive, and easier to mold than other materials. One particularly important application of plastics is the use of clear plastic in lieu of glass due to the properties noted above, as well as for safety reasons, given that most plastics do not shatter like glass upon impact. A significant market for plastic as an alternative to glass is in the automobile industry, and in particular, in the manufacture of the lens covers which are placed over the headlights and taillights.

However, there are of course significant disadvantages in the utilization of plastic materials, particularly when used to replace glass. One common problem with plastic material in such applications is that the surfaces of most plastic materials are easily scratched, thereby reducing or distorting the transmission of light waves through the plastic. Once a plastic material has been scratched, the scratch often becomes a depository for dust and dirt which, once in the scratch, is often difficult to remove, further reducing transmissivity of light through the plastic.

In addition, many plastic materials are susceptible to oxidation, yellowing and/or other discoloration due to exposure to ultra-violet radiation, such as, for example, sunlight. In some instances, the exposure to ultra-violet radiation may even cause a breakdown in the structural integrity of the plastic itself. Although many plastics incorporate an ultra-violet inhibitor, over time many of these agents lose their ability to continue to protect the plastic material.

The resultant loss of transmissivity of light through the plastic lens covers over the headlights and taillights of an automobile presents a safety hazard. Not only does this reduce the visibility of the driver of an automobile with respect to what lies in front of the vehicle, but it further presents a hazard to other drivers who may not be able to see the automobile ahead of them until it is too late.

As a result, a number of compositions and/or methods have been developed to try to resurface damaged and/or degraded plastic material to near its original state. In particular, a number of chemical compositions have been developed for use in plastic restoration. One such composition and method includes a polishing formulation comprising a mild abrasive material which is applied to the plastic material. The polishing formulation may also include detergent, surfactant, and/or water. A polishing device, such as a hand held buffer, is used to polish the plastic material, after which the residual polishing formulation and dirt must be washed off of the plastic material, which can limit or prohibit usage in certain applications due to the inability to contain the wash fluids. After polishing and washing, a silicone solution or emulsion is applied to the plastic material to fill in any microscopic imperfections and to leave a silicone film on the plastic to aid in prevention of future scratches. However, the silicone solution or emulsion is prone to wear off, which may require frequent reapplication.

An alternate composition and method involves the application of a polyurethane composition to the plastic material, which cures to form a polyurethane film to fill in scratches and restore visibility through the plastic material. The polyurethane film purportedly provides protection to the plastic material from ultra-violet radiation, however, it does nothing to restore plastic material which has already yellowed or otherwise discolored from exposure to such radiation. As indicated above, this presents a safety hazard due to the loss of transmission of light through the plastic lens covers. Further, the polyurethane composition requires a catalyst, such that once the base formulation and catalyst are mixed together, the mixture must be applied without delay before the polyurethane cures. Also, this composition may be solvent based, and as such, the potential for surface pitting, commonly known as "solvent pop," particularly in automotive applications where an automobile has been exposed to sunlight for even a short period of time, is significant.

Another method for resurfacing oxidized, yellowed, or otherwise discolored plastic material utilizes a plurality of polishing compositions. Each polishing composition is structured to effect a specific degree of restoration, through variations in the type, size, and amount of abrasive material present in the composition. This method may require application of a final buffing composition if the plastic is not sufficiently smooth after polishing. Although the method provides for the application of the various compositions by hand, the use of a mechanical polishing and/or buffing device to apply the one or more polishing and/or buffing compositions to the plastic material is recommended. As such, resurfacing via this composition and method may require numerous applications to the plastic material utilizing different formulations of the polishing and/or buffing compositions which, of course, may result in a significant increase in the time required to resurface the plastic material as opposed to a single application. The polishing and/or buffing compositions are prone to wear off, which will require this method to be repeated frequently.

As such, it would be helpful to provide a composition and/or method for resurfacing and restoring plastic materials, and in particular, the plastic lens covers over the headlights and taillights of an automobile, that may be applied without specialized equipment and/or training. It would further be beneficial for such a composition and/or method to repair scratches in the plastic lens covers to restore optical clarity through portions which are oxidized, yellowed, or otherwise discolored due to exposure to the elements such as dust, dirt, and/or ultra-violet radiation, and to prevent further oxidation, yellowing and/or discoloration. Also, any such composition and/or method would preferably pretreat, resurface, and restore the plastic lens covers with a single application of each formulation. It would also be preferable for any such composition to utilize water based coatings to minimize potential of surface pitting, and additionally, it would be preferable if at least one coating comprises an ultra-violet inhibitor.

SUMMARY OF THE INVENTION

The present invention is directed to a multi-component kit for pretreatment, resurfacing, and restoration of a plastic material, and in particular, the plastic lens covers over the headlights and taillights of an automobile. The multi-component kit includes a pretreatment formulation structured to clean the plastic lens covers and prepare them so as to facilitate application of subsequent formulations. In one embodiment, the pretreatment formulation comprises a volatile combination of alcohol having an amount of a citrus terpene solvent therein.

The multi-component kit of the present invention further comprises a resurfacing formulation structured to repair scratches in the plastic lens covers. The resurfacing formulation is further structured to remove oxidation, yellowing, and other discoloration from the plastic lens covers such as is often caused by exposure to dust, dirt, and/or ultra-violet radiation. The resurfacing formulation comprises at least one distillate, a polishing powder, and water. In one embodiment, the resurfacing formulation comprises several distillates including petroleum distillate, white spirit distillate, and oleic distillate. Additional embodiments of the resurfacing formulation may also comprise an ammonia solution and/or polydiethanolamide.

At least one embodiment of the multi-component kit of the present invention also comprises a restoration formulation which is structured to provide a high gloss shine to the plastic lens covers as well as a protective coating to protect the plastic lens covers from the elements, such as dust and dirt, as well as an ultra-violet inhibitor to protect them from the ultra-violet radiation of the sun. The restoration formulation of the present invention comprises at least one aqueous polymer and water. In one embodiment, the restoration formulation comprises a blend of methyl and ethyl methacrylate aqueous polymers. This embodiment also comprises a fluorinated hydrocarbon as well as high and low viscosity silicones. Additionally, this embodiment may comprise a mixture of dipropylene glycol methyl ether and tributoxyethyl phosphate.

An alternate embodiment of the restoration formulation of the present invention includes isocyanate polyurethane as the aqueous polymer. In addition, this alternate embodiment comprises amounts of N-methyl perilidone and triethylamine. Further, this alternate embodiment of the restoration formulation of the present invention may include an inhibited methylmethacrylate acrylic emulsion in water and/or water miscible methylmethacrylate.

Each of the aforementioned formulations of the present invention are structured to permit application to the plastic lens covers by hand, thereby eliminating the need for specialized equipment and/or training.

The present invention further encompasses a method to pretreat, resurface, and restore a plastic material, and in particular, the plastic lens covers over the headlights and taillights of an automobile. The method includes applying a pretreatment formulation to the plastic lens covers with a clean pretreatment applicator. The applicator may comprise a lint free paper towel or a lint free rag. The method also includes applying a resurfacing formulation to the plastic lens covers utilizing a clean resurfacing applicator. In at least one embodiment, the method of the present invention includes applying a restoration formulation to the plastic lens covers with, once again, a clean restoration applicator which may comprise a lint free paper towel or a lint free rag. Alternate embodiments of the method of the present invention envision the application of these formulations to larger plastic materials comprising the use of mechanical applicators.

These and other objects, features and advantages of the present invention will become more clear as the detailed description is taken into consideration.

DETAILED DESCRIPTION OF THE PREFERRED EMBODIMENT

The present invention, as indicated above, is directed to a multi-component kit for pretreating, resurfacing, and restoring a plastic material, and in particular, the plastic lens covers over the headlights and taillights of an automobile. In addition, the present invention includes a method for pretreating, resurfacing, and restoring a plastic material which comprises applying the multi-component kit to the plastic material.

The multi-component kit of the present invention comprises a pretreatment formulation primarily structured to clean the plastic lens covers. Specifically, the pretreatment formulation is applied to the plastic lens covers to remove dust, dirt, oils, silicone, and other contaminants which have deposited onto the plastic lens covers. The pretreatment formulation is also structured to remove at least some of the yellowing, haze, and/or other discoloration which is caused by exposure of the plastic lens covers to ultra-violet radiation, such as sunlight. Additionally, and more importantly, the pretreatment formulation is structured to react with the plastic lens covers so as to reduce the surface tension properties such that subsequent formulations will easily adhere to the non-porous surface of the plastic lens covers. This provides a significant advantage over known compositions and methods in that the pretreatment formulation of the present invention permits a resurfacing formulation and a restoration formulation, discussed in greater detail below, to be quickly and easily applied to the plastic lens covers by hand. The pretreatment formulation, therefore, eliminates the need for specialized equipment and/or specialized training to resurface and/or restore the plastic lens covers.

In one embodiment of the present invention, the pretreatment formulation comprises an alcohol, such as, by way of example only, methanol, ethanol, isopropyl alcohol, and denatured alcohol. Additionally, the pretreatment formulation of the present invention comprises a citrus terpene solvent. The citrus terpene solvent may be based on the extract of lemons, limes, and/or oranges.

In one preferred embodiment of the present invention, the pretreatment formulation comprises alcohol in a range of between approximately 97% to 99%, by weight, and further comprises the citrus terpene solvent in a range of 1% to 3%, by weight.

In addition to the pretreatment formulation, the multi-formulated composition of the present invention includes the resurfacing formulation, as indicated above. The resurfacing formulation is structured to remove oxidation from the plastic lens covers and, further, to remove the yellowing, haze, and/or other discoloration not removed by the pretreatment formulation. Additionally, the resurfacing formulation is structured to repair scratches in the plastic lens covers.

The resurfacing formulation of the present invention is a non-volatile combination including at least one distillate, a polishing powder, and water. In at least one embodiment, the resurfacing formulation comprises a mixture of petroleum distillate and white spirit distillate. A further embodiment may also include polydiethanolamide and oleic distillate, either blended together or as separate components of the formulation. Yet another embodiment of the resurfacing formulation of the present invention may also comprise an ammonia solution. In at least one embodiment, the ammonia solution has a concentration of approximately 25% in water.

Table 1 presents the approximate percentage ranges, by weight, of the above components in a preferred embodiment of the resurfacing formulation of the present invention:

TABLE 1

| | |
|---|---|
| petroleum and white spirit distillates | 15%–25% |
| polydiethanolamide and oleic distillate blend | 9%–16% |
| ammonia solution | 0.5%–1.2% |
| polishing powder | 23%–29% |
| water | 35%–52% |

In Table 2, the approximate percentage, by weight, of the above components present in at least one embodiment of the resurfacing formulation of the present invention are presented:

TABLE 2

| | |
|---|---|
| oleic distillate | 8.5% |
| petroleum and white spirit distillates | 19.4% |
| polydiethanolamide | 3% |
| ammonia solution (approximately 25% in water) | 0.8% |
| polishing powder | 25% |
| water | 43.3% |

At least one embodiment of the multi-component kit of the present invention further comprises a restoration formulation. The restoration formulation is preferably a water based formulation structured to provide a high gloss shine to the plastic lens covers. Additionally, the restoration formulation is structured to provide a protective coating to the plastic lens covers, thereby protecting them from exposure to the elements such as dust and dirt, as well as comprising an ultra-violet inhibitor to protect them from the damaging effects of ultra-violet radiation from, for example, the sun.

As noted above, the present invention preferably comprises a water based restoration formulation which provides several distinct advantages over known solvent based formulations such as those commonly used in automotive painting applications. As an initial matter, solvent based formulations may actually damage certain plastic materials, thereby defeating the purpose of the composition in the first place. Even in instances wherein the solvent based formulation is compatible with the plastic material, they are prone to leave the surface of the plastic material covered with small pinhole sized pits. These pits result from a reaction commonly known as "solvent pop," wherein small pockets of solvent vapor occur in the formulation as it is drying if it is applied when exposed to even moderate heat, such as often occurs on an automobile exposed to the sun. Specifically, when these small pockets of vapor rise to the surface of the formulation as it is drying, pits are formed as the vapor pockets burst and escape from the surface of the drying formulation. The utilization of a water based restoration formulation eliminates pits in the plastic material attributable to "solvent pop."

As such, a preferred embodiment of the restoration formulation of the present invention comprises at least one aqueous polymer in water. At least one embodiment comprises a blend of methylmethacrylate and ethyl methacrylate aqueous polymers. This embodiment of the restoration formulation further comprises a fluorinated hydrocarbon, and high and low viscosity silicones. In addition, this embodiment may comprise a mixture of dipropylene glycol methyl ether and tributoxyethyl phosphate.

Table 3 lists the approximate percentage ranges, by weight, of these components in one preferred embodiment of the restoration formulation of the present invention, as follows:

TABLE 3

| | |
|---|---|
| methyl/ethyl methacrylate aqueous polymer blend | 55%–65% |
| fluorinated hydrocarbon | 2%–4% |
| high viscosity silicone | 1%–4% |
| low viscosity silicone | 1%–4% |
| dipropylene glycol methyl ether / tributoxyethyl phosphate mixture | 2%–4% |
| water | 19%–39% |

In Table 4, the approximate percentage, by weight, of the above components present in at least one embodiment of the resurfacing formulation of the present invention are presented as follows:

TABLE 4

| | |
|---|---|
| methyl/ethyl methacrylate aqueous polymer blend | 61% |
| fluorinated hydrocarbon | 2.8% |
| high viscosity silicone | 1.3% |
| low viscosity silicone | 1.3% |
| dipropylene glycol methyl ether / tributoxyethyl phosphate mixture | 3.3% |
| water | 30.3% |

An alternate embodiment of the restoration formulation of the present invention comprises isocyanate polyurethane as the aqueous polymer. This alternate embodiment may also comprise N-methyl perilidone and triethylamine. A further embodiment of the restoration formulation may comprise an inhibited methylmethacrylate emulsion and/or water miscible methylmethacrylate.

Table 5 provides the approximate percentage ranges, by weight, in which these components are present in one preferred alternate embodiment of the restoration formulation of the present invention:

TABLE 5

| | |
|---|---|
| isocyanate polyurethane aqueous polymer | 30%–40% |
| N-methyl perilidone | 9%–16% |
| triethylamine | 1%–6% |
| inhibited methylmethacrylate emulsion | 3%–5% |
| water miscible methylmethacrylate | 8%–12% |
| water | 23%–47% |

In Table 6, the approximate percentage, by weight, of the above components, by weight, in at least one embodiment of the resurfacing formulation of the present invention are provided as follows:

TABLE 5

| | |
|---|---|
| isocyanate polyurethane aqueous polymer | 33% |
| N-methyl perilidone | 11% |
| triethylamine | 3% |
| inhibited methylmethacrylate emulsion | 4.6% |
| miscible methylmethacrylate | 10% |
| water | 38.4% |

As indicated above, the present invention further comprises a method for pretreating, resurfacing, and restoring a plastic material, and in particular, the plastic lens covers over the headlights and taillights of an automobile. The method comprises applying a pretreatment formulation to the plastic lens covers with a clean pretreatment applicator, such as, by way of example only, a lint free paper towel or a lint free rag. Applying the pretreatment formulation preferably comprises wiping an entire area of the plastic lens covers requiring pretreatment by hand with the pretreatment applicator, containing the pretreatment formulation, until dust, dirt, oil, and other contaminants are removed, such that a clean portion of the pretreatment applicator is no longer discolored upon further wiping of the plastic lens covers.

The method of the present invention further comprises applying a resurfacing formulation to the plastic lens covers with a clean resurfacing applicator including, but not limited to, a lint free paper towel or a lint free rag. Applying the resurfacing formulation preferably comprises wiping the entire area of the plastic lens covers by hand with the clean resurfacing applicator utilizing a back and forth motion under moderate pressure. In a preferred embodiment, the method further comprises wiping residual resurfacing formulation off of the entire surface of the plastic lens covers using a clean portion of the clean resurfacing applicator, to assure proper bonding of a restoration formulation. In at least one embodiment, the present invention comprises applying the resurfacing formulation to the plastic material with a buffer. This alternate embodiment is particularly effective for applying the resurfacing formulation to large plastic materials such as, by way of example only, picture windows and hurricane panels. However, at least one alternate embodiment comprises applying a plurality of coats of resurfacing formulation, although it should be noted that this alternate embodiment is generally limited to instances where the plastic lens covers are initially in a severely degraded and/or damaged condition.

At least one embodiment of the method of the present invention further comprises applying the restoration formulation to the plastic lens covers with a clean restoration applicator such as, once again by way of example only, a lint free paper towel or a lint free rag. In a preferred embodiment, the application of the restoration formulation comprises wiping the entire area of the plastic lens covers by hand with the clean resurfacing applicator. Alternate embodiments of the present invention comprise applying the restoration formulation via a spray device, such as a spray paint gun or an air brush, or in yet another alternate embodiment, applying the restoration formulation is accomplished via a foam or roller type brush. In a preferred embodiment, applying a single coat of the restoration formulation to the plastic lens covers is sufficient to achieve the desired results, however, at least one alternate embodiment comprises applying a plurality of coats of restoration formulation in order to achieve a higher gloss shine.

Since many modifications, variations and changes in detail can be made to the described preferred embodiment of the invention, it is intended that all matters in the foregoing description be interpreted as illustrative and not in a limiting sense. Thus, the scope of the invention should be determined by the appended claims and their legal equivalents.

Now that the invention has been described,

What is claimed is:

1. A multi-component kit for pretreatment, resurfacing, and restoration of a plastic material comprising:
   a pretreatment formulation comprising an alcohol and a citrus terpene solvent,
   a resurfacing formulation comprising a non-volatile mixture of at least one distillate, a polishing powder, and water, and
   a restoration formulation comprising at least one aqueous polymer and water.

2. The multi-component kit as recited in claim 1 wherein said pretreatment formulation comprises said alcohol in a range of 97% to 99% and said citrus terpene solvent in a range of 1% to 3%.

3. The multi-component kit as recited in claim 1 wherein said at least one distillate comprises petroleum distillate, white spirit distillate and oleic distillate.

4. The multi-component kit as recited in claim 3 wherein said resurfacing formulation further comprises polydiethanolamide and an ammonia solution.

5. The multi-component kit as recited in claim 4 wherein said ammonia solution comprises a concentration of approximately 25%.

6. The multi-component kit as recited in claim 1 wherein said resurfacing formulation comprises a blend of petroleum and white spirit distillates in a range of approximately 15% to 25%, a polydiethanolamide and oleic distillate blend in a range of approximately 9% to 16%, an ammonia solution in a range of approximately 0.5% to 1.2%, said polishing powder in a range of approximately 23% to 29% and said water in a range of approximately 35% to 52%.

7. The multi-component kit as recited in claim 4 wherein said resurfacing formulation comprises said oleic distillate in an amount of approximately 8.5%, a blend of said petroleum and said white spirit distillates in an amount of approximately 19.4%, said polydiethanolamide in an amount of approximately 3%, said ammonia solution in an amount of approximately 0.8%, said polishing powder in an amount of approximately 25%, and said water in an amount of approximately 43.3%.

8. The multi-component kit as recited in claim 1 wherein said at least one aqueous polymer comprises methylmethacrylate and ethyl methacrylate.

9. The multi-component kit as recited in claim 8 wherein said restoration formulation further comprises a fluorinated hydrocarbon, a high viscosity silicone, a low viscosity silicone, dipropylene glycol methyl ether and tributoxyethyl phosphate.

10. The multi-component kit as recited in claim 9 wherein said restoration formulation comprises said blend of methylmethacrylate aqueous polymer and ethyl methacrylate aqueous polymer in a range of approximately 55% to 65%, said fluorinated hydrocarbon in a range of approximately 2% to 4%, said high viscosity silicone in a range of approximately 1% to 4%, said low viscosity silicone in a range of approximately 1% to 4%, a mixture of said dipropylene glycol methyl ether and said tributoxyethyl phosphate in a range of approximately 2% to 4% and said water in a range of approximately 19% to 39%.

11. The multi-component kit as recited in claim 1 wherein said restoration formulation comprises a blend of methylmethacrylate aqueous polymer and ethyl methacrylate aqueous polymer in an amount of approximately 61%, a fluorinated hydrocarbon in an amount of approximately 2.8%, a high viscosity silicone in an amount of approximately 1.3%, a low viscosity silicone in an amount of approximately 1.3%, a mixture of dipropylene glycol methyl ether and tributoxyethyl phosphate in an amount of approximately 3.3% and said water in an amount of approximately 30.3%.

12. The multi-component kit as recited in claim 1 wherein said restoration formulation further comprises N-methyl perilidone, triethylamine, an inhibited methylmethacrylate emulsion and water miscible methylmethacrylate, and said at least one aqueous polymer comprises isocyanate polyurethane.

13. The multi-component kit as recited in claim 1 wherein said restoration formulation further comprises N-methyl perilidone in a range of approximately 9% to 16%, triethylamine in a range of approximately 1% to 6%, isocyanate polyurethane in a range of approximately 30% to 40%, an inhibited methylmethacrylate emulsion in a range of approximately 3% to 5%, water miscible methylmethacrylate in a range of approximately 8% to 12%, and said water in a range of approximately 23% to 47%.

14. The multi-component kit as recited in claim 1 wherein said restoration formulation further comprises N-methyl perilidone in an amount of approximately 11%, triethylamine in an amount of approximately 3%, an inhibited methylmethacrylate emulsion in an amount of approximately 4.6%, water miscible methylmethacrylate in an amount of approximately 10% and said water in an amount of approximately 38.4%, and said at least one aqueous polymer comprises isocyanate polyurethane in an amount of approximately 33%.

* * * * *